United States Patent [19]

Robinson, Jr. et al.

[11] Patent Number: 4,636,395
[45] Date of Patent: Jan. 13, 1987

[54] METHOD FOR HEAT TREATING FOOD

[75] Inventors: Albert H. Robinson, Jr., Plymouth Meeting; Walter W. Egee, deceased, late of Wallingford, both of Pa., by Elizabeth J. Egee, executrix

[73] Assignee: Campbell Soup Company, Camden, N.J.

[21] Appl. No.: 745,956

[22] Filed: Jun. 18, 1985

Related U.S. Application Data

[63] Continuation-in-part of Ser. No. 435,242, Oct. 19, 1982, abandoned.

[51] Int. Cl.$^4$ .............................................. A23L 3/18
[52] U.S. Cl. .................................... 426/511; 99/470; 165/2; 426/521
[58] Field of Search ............... 426/506, 511, 520, 521, 426/524, 399; 99/470, 483, 474; 165/2, 61; 53/407, 440, 127; 422/26

[56] References Cited

U.S. PATENT DOCUMENTS

| | | | |
|---|---|---|---|
| 1,756,549 | 4/1930 | Hansen | 426/402 |
| 1,756,550 | 4/1930 | Hansen | 426/402 |
| 1,987,824 | 1/1935 | Hansen | 426/399 |
| 2,011,631 | 8/1935 | Hansen | 426/399 |
| 2,237,739 | 7/1939 | Jones | 426/399 |
| 2,403,871 | 7/1946 | McBean | 426/510 |
| 2,581,484 | 1/1952 | Helgerud | 426/509 |
| 2,680,352 | 6/1954 | McMahon | 165/2 |
| 2,912,330 | 11/1959 | Hawk et al. | 426/233 |
| 2,967,773 | 1/1961 | Anderson | 426/233 |
| 3,073,236 | 4/1963 | Blaschek et al. | 99/420 |
| 3,592,668 | 3/1968 | Denk | 99/470 |
| 3,718,082 | 2/1973 | Lipoma | 99/470 |
| 3,721,572 | 3/1973 | Cory | 426/524 |
| 3,846,570 | 11/1974 | Vetter et al. | 426/399 |
| 3,853,622 | 12/1974 | Rutten | 422/26 |
| 3,886,296 | 5/1975 | Brooks et al. | 426/325 |
| 3,897,210 | 7/1975 | Gruber et al. | 426/318 |
| 4,059,919 | 11/1977 | Green | 426/521 |
| 4,148,933 | 4/1979 | Janovtchik | 426/402 |
| 4,154,861 | 5/1979 | Smith | 426/466 |
| 4,156,741 | 5/1979 | Beauvais et al. | 426/402 |
| 4,167,585 | 9/1979 | Caridis et al. | 426/233 |
| 4,255,459 | 3/1981 | Glen | 426/521 |
| 4,336,274 | 6/1982 | Ross et al. | 426/524 |

Primary Examiner—George Yeung
Attorney, Agent, or Firm—Banner, Birch, McKie & Beckett

[57] ABSTRACT

Method and apparatus for pasteurizing appropriately sized discrete fresh food pieces are disclosed in which a finite portion of the food pieces is retained in an essentially immobile condition within a confined treatment zone while heating and cooling fluids are sequentially passed in direct contact through the food pieces for providing rapid heating thereof to a pasteurization temperature and similarly rapid cooling to a near ambient temperature so as not to significantly degrade the organoleptic quality of the fresh food pieces.

18 Claims, 4 Drawing Figures

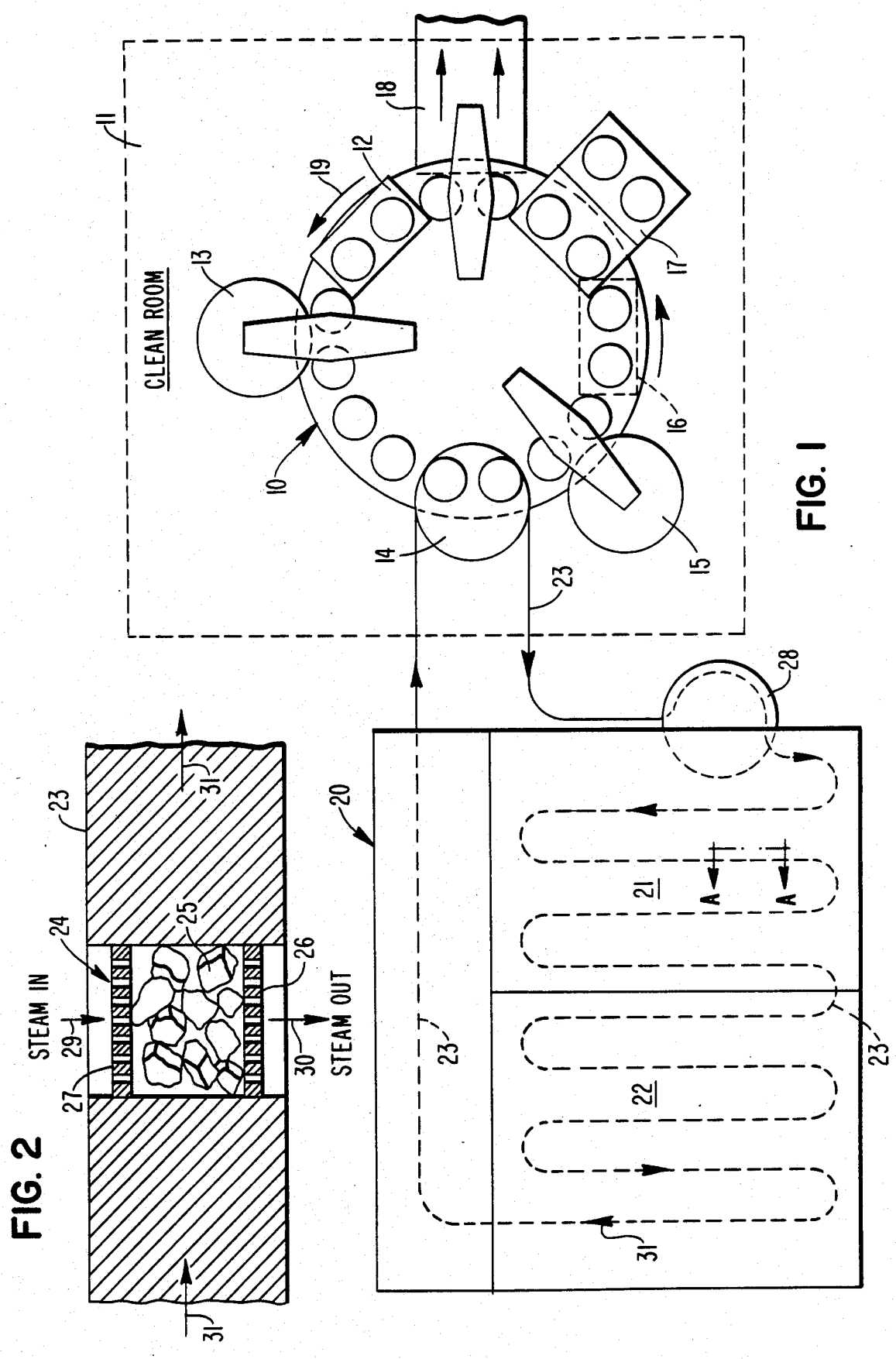

METHOD FOR HEAT TREATING FOOD

This application is a continuation-in-part of application Ser. No. 435,242, filed Oct. 19, 1982, now abandoned.

FIELD OF THE INVENTION

This invention relates to the heat treating and subsequent packaging of discrete food pieces and more particularly to a method and apparatus for pasteurizing and packaging fresh foods such as fruits, vegetables and nuts for use as garnish

BACKGROUND OF THE INVENTION

Processed foods, including both canned and frozen foods, are widely used by consumers as substitutes for fresh foods, especially in preparing hot food items. By using such products, consumers avoid significant preparation time associated with cleaning and trimming fresh foods. Moreover, processed foods can be stored without spoiling for much longer periods than fresh foods, further adding to consumer convenience.

Fresh foods, however, continue to be used exclusively in certain cases, for example, as garnishes for salad. In these instances, the color, crispness and related textural properties of the food are generally of prime importance. Unfortunately, processing conditions used to produce canned and frozen food products unavoidably impair the organoleptic quality of the fresh foods in this regard to a degree found unacceptable by consumers.

A product having the convenience of the processed foods, yet retaining the texture, taste and color of fresh foods would be highly desirable.

It is an object of this invention to provide both method and apparatus for preparing such a product.

It is another object of this invention to provide both method and apparatus for heating treating fresh foods which does not significantly affect their organoleptic properties.

It is a further object of this invention to provide both method and apparatus for pasteurizing fresh foods to produce a product having many of the advantages of processed foods.

It is still another object of this invention to provide both method and apparatus for pasteurizing fresh foods so that they can be stored for limited periods of time in an appropriate environment without spoiling.

DISCLOSURE OF THE INVENTION

These and other objects are provided by the present invention which is based on the thermal processing of properly sized discrete fresh food pieces. According to this invention, fresh foods including fruits, vegetables and nuts are treated under controlled conditions to produce a product having an extended storage life relative to fresh foods when stored in an appropriate environment, e.g., under typical household refrigeration.

In one aspect, the present invention provides a continuous method of heating treating discrete pieces of fresh foods without affecting their organoleptic properties comprising the steps of:

(a) filling individual confined treatment zones with said discrete food pieces, said confined treatment zones adapted to retain separate, finite portions of essentially immobile discrete food pieces while permitting fluids to flow therethrough;

(b) conveying said confined treatment zones through a thermal processing zone comprising a heating zone and a cooling zone;

(c) passing said confined treatment zones through said heating zone and flowing a heating fluid through said confined treatment zones so as to rapidly heat by direct contact the entire mass of food pieces therein to an elevated temperature without significantly degrading the texture, structure, taste and color of the fresh food pieces; (d) thereafter passing said confined treatment zones through said cooling zone and flowing a cooling fluid through said confined treatment zones so as to rapidly cool by direct contact the previously heated food pieces to near ambient temperature; and (e) discharging said near ambient temperature discrete food pieces from said confined treatment zones into containers under purified conditions.

In another aspect, the present invention provides an apparatus for heat treating discrete pieces of fresh foods in a continuous manner without significantly affecting their organoleptic properties comprising:

a plurality of confined treatment zones for retaining separate, finite portions of essentially immobile discrete food pieces, said zones having opposite inlet and outlet sides which allow the passage of fluid therethrough;

means for conveying said confined treatment zones through a thermal processing zone comprising a heating zone and a cooling zone;

means for flowing a heating fluid through said confined treatment zones in said heating zone in sufficient quantity and velocity to rapidly purge air from said confined treatment zones and to rapidly heat by direct contact the entire mass of food pieces to an elevated temperature;

means for flowing a cooling fluid through said confined treatment zones in the cooling zone; and means for discharging cooled food pieces from said confined treatment zones into containers for packaging under purified conditions.

According to the invention, discrete pieces of fresh foods are first loaded into confined treatment zones. Each confined treatment zone is designed to retain a separate, finite portion of the food pieces in an essentially immobile condition. As used throughout the specification and claims, the phrase "essentially immobile" means that the discrete food pieces are unable to move with respect to the confined treatment zone except for incidental motion caused by the flow of fluids therethrough, as will be described in more detail hereinafter. As an example, the confined treatment zone may comprise a recess or cup in an endless conveyor belt, the recess having a porous bottom retainer and an open top. As used herein, the term "porous" means openings sufficiently small to prevent the discrete food pieces from passing therethrough, yet sufficiently large to allow the free flow-through of liquids and gases.

Usually, the fresh foods will have been previously subjected to a variety of operations including peeling, coring, trimming and dicing to the desired particle size. Generally, pieces having a minimum dimension of no greater than one-half inch are suitable. The pieces will generally have a largest dimension on the order of one to two inches. For example, the present invention is preferably employed for pasteurizing whole sections of citrus fruits such as oranges, grapefruits, etc; mushroom caps; large apple and pineapple chunks; broccoli and cauliflower florets; carrot, onion and pepper slices; etc. Preferably, the fresh food pieces are sized so that the heating and cooling of each food piece occurs rapidly and uniformly as discussed more fully hereafter. In this way, the potential for either excessive treatment and coincident impairment of organoleptic quality or insufficient treatment and incomplete pasteurization is minimized.

A heating fluid, generally steam, is flowed through each confined treatment zone so as to rapidly heat, by direct contact, the entire mass of food pieces. The heating fluid is flowed through each treatment zone in sufficient quantity and velocity to rapidly purge all air from the treatment zone and heat the food pieces as rapidly as possible to the desired elevated temperature. It is important that all air be rapidly purged from the treatment zone as any entrapped air surrounding the food pieces acts as an insulating layer preventing rapid heating thereof. Preferably, steam is used as the heating fluid and is passed downwardly through each treatment zone. In this way any condensed steam will be readily discharged from the treatment zone. For example when a recess or cup having a porous bottom retainer and an open top is used as the confined treatment zone, the steam will pass downwardly through the confined food pieces and will exit through the porous bottom retainer, forcing any condensate to also flow through the porous retainer. As with air, condensed steam acts as an insulating layer impeding rapid heating of the food pieces. Suitably rapid heating is critical to producing food pieces having the desired organoleptic properties.

In the preferred practice of this invention, the food pieces are rapidly heated to a pasteurization temperature in the range of 165° to 185° F. (74° to 85° C.). Generally, saturated steam at substantially atmospheric pressure, i.e., steam at a temperature of 212° F. (100° C.), will be used as the heating fluid. Alternatively, hot water having a temperature above about 200° F. (93° C.) may also be employed. In some circumstances, low pressure, saturated steam may also be used although highly pressurized steam is generally not required for pasteurization and may lead to overheating of the food pieces. Steam is normally preferred to hot water because of its higher heat content due to the added heat of vaporization.

Heating continues until the coldest point in the food pieces has been heated to the desired temperature. Generally, the pieces are sized so that when using steam, treatment from about one to three minutes will be required to reach an appropriate temperature. In any event, heating should not be extended to more than about 10 minutes. Heating to the preferred temperature range is sufficient to inactivate enzymes in the food pieces and destroy any yeast and molds present. Fortunately, it has been discovered that such rapid heating does not significantly alter the crispness and related textural properties of the food pieces. Preferably, to avoid noticeable degradation of the organoleptic qualities of the fresh food pieces, heating is completed within one to three minutes. This type of treatment is known in the art as pasteurization, which is to be contrasted with sterilization wherein sufficient heating is provided to eradicate all microbial activity. Sterilization procedures, which generally impair the organoleptic qualities of fresh foods, are widely employed in canning operations.

After the food pieces have been heated to the required degree, a cooling fluid, generally sterile water is flowed through each confined treatment zone in sufficient quantity and rate to rapidly cool the food pieces by direct contact. For example, a water spray may be directed at the top of each confined treatment zone. The cooling water then flows through the discrete food pieces by gravity. Rapid cooling is equally as important to preserving the organoleptic qualities of the fresh food pieces as is rapid heating. The food pieces are cooled to near ambient temperatures. More specifically, the food pieces are cooled to less than about 110° F. (43° C.) within 10 minutes after reaching the pasteurization temperature. Preferably, the food pieces are cooled to at least 100° F. (38° C.) within five minutes after reaching the pasteurization temperature. Most preferably, the above cooling is completed within three minutes after the food pieces reach pasteurization temperatures.

When using water, its temperature can be adjusted within wide limits; but generally the temperature will be between about 40° and 85° F. (5° to 30° C.). It is also within the purview of the present invention to use a cooling gas, for example, air, nitrogen or a fluorocarbon, to rapidly cool the food pieces. When using a cool gas, in addition to convective cooling, evaporative cooling also aids the rapid lowering of the food pieces' temperature. Such evaporation produces a dry product, which may be desired in certain circumstances.

Since the food pieces generally will be packaged with a liquid component, a portion of the cooling load may be handled by this component after packaging. In any event, the final equilibrated temperature of the food pieces and any other component in the final package should be about the same as ambient, i.e., near ambient.

As noted above, both the heating and cooling fluids are "flowed through" the confined treatment zones. As used throughout the specification and claims, the phrases "flowed through", "flowing through" and other phrases of similar import mean that a fluid is introduced into one side of a confined treatment zone for flow around and in direct contact with the discrete food pieces and the fluid then exists the confined treatment zone from its opposite side. Aside from unavoidable flow irregularities induced by flow around the discrete food pieces, the fluid streamlines generally parallel a straight line between the opposing inlet and outlet sides of the confined treatment zone. Fluid flow patterns that create stagnant fluid zones are to be particularly avoided. Flow in this fashion is important for achieving proper heat treatment of the food pieces while minimizing organoleptic degradation.

The cooled, heat treated food pieces are transferred under purified conditions from the confined treatment zone preferably into a single-size serving container. As will be discussed later, by treating the food pieces in a confined treatment zone sized for single-servings, e.g., about 4.0 to 32.0 fluid ounces (0.1 to 1.0 l) in volume, particular advantages are realized in heating, cooling and general handling of the food pieces. Purified filling can be done by feeding the food pieces directly from the treatment zone in a closed purified environment to the serving container. The container is hermetically sealed and is suitable for commercial sale.

As noted above, a liquid component such as flavored sauce, salad dressing, etc., will generally also be included in the final product formulation. This liquid phase is sterilized and cooled by conventional techniques, and processing of this component forms no part of the present invention. The liquid phase will generally contain various adjuvants to enhance the flavor of the final product. If desired, the liquid phase may also contain a chemical preservative such as formic, benzoic, and sorbic acids or their derivatives, for example, the sodium or potassium salts thereof.

The order in which the processed food pieces and liquid phase are introduced into the container during the packaging procedure is of no particular significance. In one approach, a portion of the liquid phase will first be added, followed by a portion of the food pieces, followed by more liquid and so on. In another approach, a portion of the liquid phase is added to the container, then all of the food pieces are added, followed by the remaining liquid. The containers are, of course, hermetically sealed after introducing all of the liquid and food pieces thereto.

The product produced by the above-described procedures typically will have a refrigerated shelf life of at least 28 days. The contained food pieces will have the organoleptic qualities of fresh food and may for example comprise a satisfactory substitute for fresh foods as a salad garnish.

While the invention has been specifically described in connection with the pasteurization and packaging of single-serving size batches of food pieces used for example as salad garnish, it will be understood by those skilled in this art that the invention is equally applicable to the treatment of larger portions. In addition, it is also contemplated that in certain embodiments a single larger-sized container may be filled with the contents of several smaller-size confined treatment zones.

In the broad practice of this invention, as described above, the confined treatment zones may be stationary and the various operative steps are carried out by bringing each required element into proper functional relationship with each treatment zone. Alternatively, in the preferred embodiment the confined treatment zones are moveable and the various operative steps are carried out by moving the treatment zones into functional juxtaposition with the various elements needed to effect each operative step. In this latter arrangement, each confined treatment zone preferably comprises a recess or cup in an endless conveyor belt each recess having a porous bottom retainer and an open top. Movement of the belt serially transfers each treatment zone through a filling zone, a cooling zone and a packaging zone. A more detailed description of this preferred arrangement is provided by referring to the attached drawings and accompanying disclosure.

BRIEF DESCRIPTION OF THE DRAWINGS

FIG. 1 is a schematic illustration of apparatus useful for practicing the present invention.

FIG. 2 is a partial, cross-sectional view taken along line A—A of FIG. 1 of a confined treatment zone useful in transporting fresh food pieces through a thermal processing zone of the present invention.

DETAILED DESCRIPTION

Figure 3:
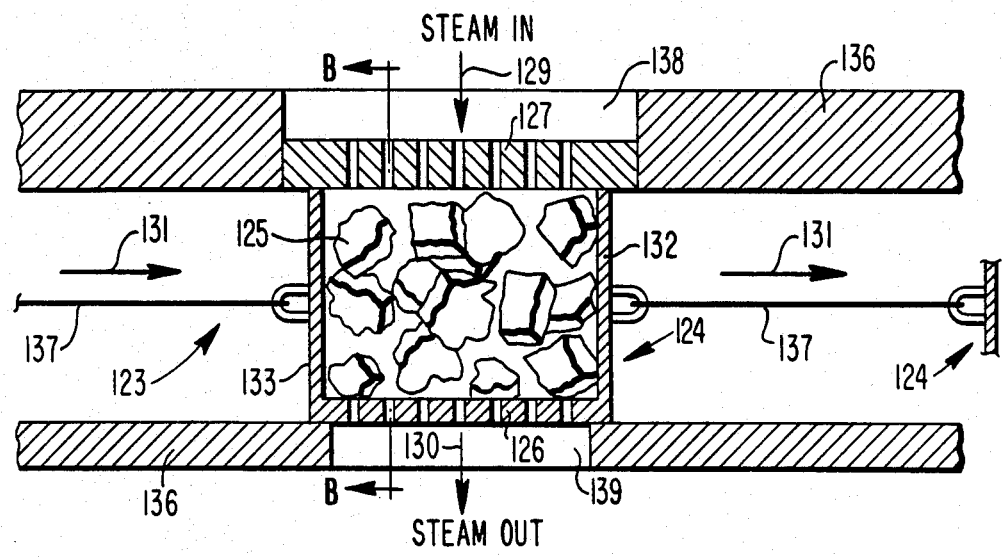
FIG. 3 is an alternative design to the FIG. 2 cross-sectional view of a confined treatment zone useful in transporting fresh food pieces through the thermal processing zone of the present invention.

Referring to FIG. 1, a conventional filling machine 10 is located in a clean room 11 in which air entering the room is carefully treated, for example, by filtering, etc., to prevent contaminants such as airborne dust and bacteria from contaminating the final product. The filling machine 10 is designed to automatically dispense preformed, single-serving sized containers at feeder 12, and advance them past various filling stations 13, 14 and 15 in the direction of arrow 19, to a closing station 17 where preformed covers seal the filled containers. At station 16, the containers can be marked with any desired indicia; e.g., a date code. Therafter, the sealed product is discharged by conveyor 18 to final packaging.

In the illustrated embodiment, filling stations 13 and 15 are designed to dispense accurately measured doses of a flavored liquid into the containers, the liquid having previously been sterilized and cooled by conventional techniques. Filling station 14 dispenses unit amounts of heat treated discrete food pieces into the advancing containers.

In this preferred embodiment, the food pieces are heat treated in a thermal processing zone 20, comprising a heating zone or chamber 21 and a cooling zone or chamber 22. Discrete food pieces of the appropriate particle size are initially dispensed into individual recesses or cups in an endless conveyor belt, schematically represented by line 23, at filling zone or station 28.

FIG. 2 illustrates in cross section one design suitable for endless belt 23. The main structure of the belt can be of conventional construction. As shown, belt 23 includes recess or cup 24 into which discrete food pieces 25 are filled. The recess has a porous bottom retainer 26 and an open top. In this embodiment, a porous top retainer comprising plate 27 is positioned over recess 24 to prevent food pieces from spilling therefrom. Obviously, plate 27 is designed so that it can easily be removed and replaced during the filling of food pieces into and the discharging of food pieces from recess or cup 24. As used throughout the specification and claims, the phrase "open-top" in addition to having its obvious meaning also includes any other arrangement that permits generally unrestricted flow of heating or cooling fluids into and through recess 24, including such elements as porous plates, screens, foraminous plugs, etc.

The recess or cup 24 is preferably sized to hold a separate, finite portion of food pieces equivalent to the unit amount dispensed into the single-serving size containers at filling station or packaging zone 14. One advantage of matching the size of the confined treatment zone to the size of the final product container is that structural damage to the food pieces caused by mechanical handling is minimized. Handling larger batch sizes destined for smaller product containers tends to degrade the integrity and texture of the discrete food pieces, thereby impairing their organoleptic quality. After initial processing of the fresh food to the required particle size, the food pieces are subjected, according to this preferred embodiment to only two additional handling steps: filling into the confined treatment zones, i.e., recess 24, and subsequent dispensing into the final product containers. By heat treating each separate finite portion of the discrete food pieces within a confined treatment zone, degradation of product quality due to particle abrasion is minimized. Since the discrete food pieces are retained in the confined treatment zone, e.g., recess 24, in essentially an immobile condition, their structural integrity is not altered by collisions and friction between other food pieces or the surrounding apparatus.

Additionally, by limiting the size of the individual batches, the processes of heating and cooling can be accomplished more efficiently and the quality of the product more closely maintained. Generally, as the batch size increases aberrant flow phenomenon associated with the heat transfer fluids and the development of larger intra-batch temperature gradients may lead to non-uniform treatment of the discrete food pieces. In the broad practice of this invention, however, the size of the confined treatment zone, e.g. recess 24 need not be limited solely to a single-serving size and larger sizes are contemplated provided that product quality is adequately maintained.

In the illustrated embodiment of FIG. 2 the filled treatment zone, i.e., recess 24, is advanced sequentially through the heating and cooling zones or chambers 21 and 22 of the thermal processing zone 20 by moving belt 23 in the direction of arrow 31. As readily appreciated by those skilled in the art, belt 23 preferably is passed into heating zone 21 of the thermal processing zone 20 through an appropriate seal that maintains the thermal integrity of zone 21. In heating zone 21, the heating fluid is flowed through the recess or cup so as to rapidly heat, by direct contact, the entire mass of the food pieces. Based on a variety of factors, including the size of the treatment zone, i.e., recess or cup 24, the heat capacity of the discrete food pieces 25, the sizes of the discrete food pieces, the length of travel in zone 21, the speed of belt 23, and the temperature of the heating fluid, the fluid is flowed through recess or cup 24 in sufficient quantity and rate to purge all air from the treatment zone and rapidly heat the food pieces to the desired elevated temperature. Generally when using saturated steam at atmospheric pressure, treatment for one to three minutes in zone 21 will be sufficient to reach pasteurization temperatures of 165° to 185° F. (74° to 85° C.). This treatment suffices to inactivate enzymes and destroy yeasts and molds without significantly degrading the crispness and other oganoleptic qualities of the food pieces. In preferred practice, when using steam it is passed downwardly through the treatment zones, i.e., downwardly through recess or cup 24 so that it exits through porous bottom retainer 26; see for example arrows 29 and 30 in FIG. 2. In this way any condensed steam, which acts as an insulating layer to impede rapid heating of the food pieces, will be readily discharged from the treatment zone. As noted above, hot water can also be used as the heating fluid.

Figure 4:
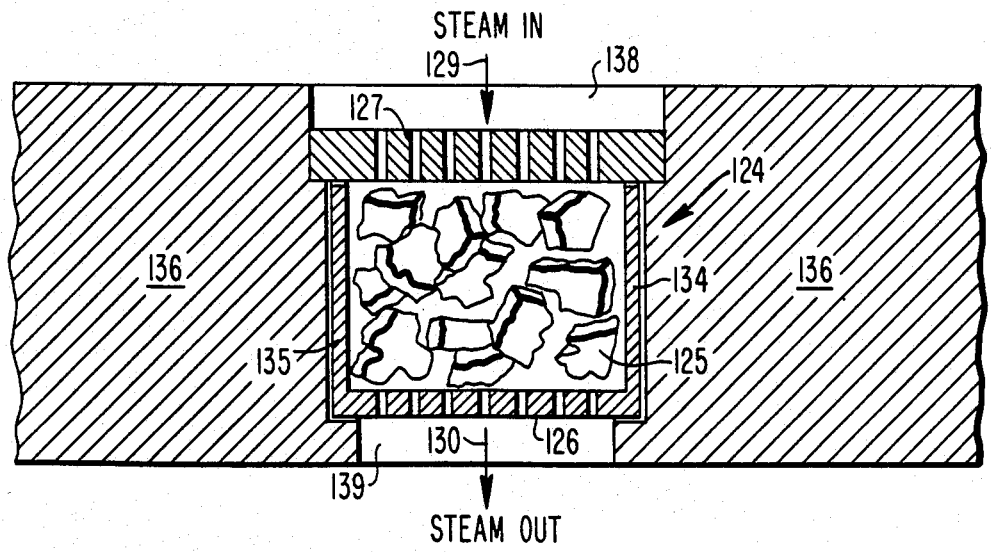
FIG. 4 is a cross-sectional view of the FIG. 3 design when viewed along line B—B of FIG. 3.

The treatment of the food pieces in zone 21 can suitably be provided by continuously indexing the belt 23 through the heating zone 21 such that each recess 24 is repeatedly positioned directly under spaced sprays or jets of the heating fluid. In an alternative embodiment, heating stations defined by spaced sprays or jets of the heating fluid can be provided by sandwiching the moving belt 23 between appropriately configured plate members having openings therein corresponding to the location of the sprays or jets. In this alternate embodiment, an example of which is illustrated in FIGS. 3 and 4 to be discussed hereafter, each recess 24, in effect is sealed from the overall environment of the treatment chamber except when it is brought into registry with the openings at each treatment station. It also is contemplated that this sealed arrangement could be used over only a part of the path traversed by the belt 23 as it passes through the heating zone 21. For example, this construction could be used in fashioning a seal at the inlet to zone 21.

In further modifications of the present invention, the individual sprays or jets of the heating fluid could be activated only when a recess is brought into alignment with a spray or they could be continuously activated. In the former case, during the movement of each recess between the spaced sprays, the sprays or jets would be turned off or deactivated. With the former embodiment, it also is possible, in the broad practice of this invention, to expose each recess 24 to only a single spray or jet of heating fluid once it enters the heating zone 21. In this case an array of the recesses 24 in belt 23 would be indexed into heating zone 21, into alignment with an array of sprays or jets of the heating fluid. Once aligned, the sprays would be activated for a sufficient period of time to heat treat the food pieces in each confined treatment zone or recess 24 in the manner required by the present invention. Once treatment is completed, the sprays would be turned off and the belt 23 moved forward to discharge the recesses from the heating zone 21. Other arrangements for flowing the heating fluid through the recesses 24 in heating zone 21 will be readily apparent to those skilled in the art.

The filled treatment zone is then conveyed through the cooling zone of chamber 22, where sterile water is flowed through the treatment zone, i.e., recess 24 to rapidly cool the food pieces, also by direct contact. In an alternate embodiment, a cooling gas can be flowed through the treatment zone, i.e., recess 24, to provide the required degree of cooling. The quantity and flow rate of the cooling medium used depends upon factors similar to those identified above in connection with the heat treatment operation. The food pieces will be cooled to near ambient temperature. The amount of cooling provided in zone 22 can be adjusted based on the degree of cooling subsequently provided by the liquid component which is added to the product container at filling stations 13 and 15.

Generally it is desirable to prevent the thermally inefficient mixing of the environments of heating zone 21 and cooling zone 22. As recognized by those skilled in the art this can be done using a wide variety of arrangements. In one embodiment, the two zones could be separated by a thermal barrier such as a wall with an appropriately designed seal for maintaining the thermal integrity of each zone. A design, similar to the seal used at the entrance to zone 21 could be used. Alternatively, it also may be possible to dispense with any thermal barrier whatsoever and instead use the heating station embodiment, discussed above in connection with heating zone 21 and as shown more clearly in FIGS. 3 and 4, throughout the thermal processing zone 20. In this way each recess 24 would be isolated from the overall environment of the thermal processing zone except when aligned with a specific spray or jet of the heating and cooling fluids. The other design options discussed above in connection with heating zone 21 would also be applicable to cooling zone 22.

The heat treated and cooled food pieces are then discharged from the thermal processing zone 20 and are dispensed from each confined treatment zone, i.e., recess or cup 24, into the product containers at filling station of packaging zone 14. Obviously, the transfer of the confined treatment zones from the thermal processing zone 20 to the filling station or packaging zone 14 in clean room 11 will be done so that contamination of the treated product is prevented. Arrangements for conducting this transfer will be apparent to those skilled in this technology. Although the invention has been specifically described with the entire filling operation taking place in a clean room environment 11, the various dispensing elements can be arranged in any fashion that prevents contamination of the final product, i.e., filling under purified conditions.

Heat treating the discrete food pieces in a confined treatment zone distinct from the final product containers allows the use of packaging techniques and materials not suitable for elevated temperature exposure. For example, low cost plastic containers, e.g., polystyrene, having any of the well-known easy-to-open features may be used. The pasteurized product is suitable for extended storage, i.e., at least 28 days, under refrigerated conditions, i.e., temperatures below about 45° F.

Referring now to FIGS. 3 and 4, an alternative design for belt 23 and recess or cup 24 which are illustrated in the FIGS. 1 and 2 embodiment will now be described. Elements equivalent to those illustrated in the FIGS. 1 and 2 embodiment will be referenced in FIGS. 3 and 4 by the same numeral increased by 100.

As shown in FIGS. 3 and 4, belt 123 comprises a plurality of cups 124 (only one is shown), coupled together by linking means 137. Each cup 124 has an open top, side walls 132 through 135 and a porous bottom 126. Belt 123 and accordingly cups 124 are sandwiched between and surrounded by the enclosure chute or tunnel 136. The belt 123 moves through the tunnel 136 in the direction of arrows 131. At spaced locations in the tunnel 136 openings 138 and 139 are provided in its upper and lower surfaces, respectively, corresponding to the location of heating or cooling sprays or jets in the treatment chamber. In order to prevent loss or damage to the contained food pieces 125 and to facilitate distribution of the heating and cooling fluids across the entire cross-section of each cup 124, the upper openings in tunnel 136 are each fitted with an appropriately designed porous plate 127.

As the belt is moved through tunnel 136, the cups 124 are sequentially brought into registry with the openings 138 and 139 and at that time the food pieces in the cup are exposed to the treatment fluid, e.g., steam or cool liquid, flowing in the direction of arrows 129 and 130. After receiving the proper amount of treatment, the belt 123 and accordingly the cups 124 are moved through the tunnel 136 to the next treatment station.

A specific example of the present invention which is not intended to limit the scope of the invention is presented below.

EXAMPLE

The suitability of the method and apparatus of this invention to rapidly heat and cool properly sized discrete fresh food pieces, so as to pasteurize the food pieces without impairing their organoleptic quality, was demonstrated in a series of controlled test. In these tests, a recess or cup, having a porous bottom retainer and a porous lid was filled with a metered amount of discrete food pieces. The cup had a fluid volume of 5.96 in$^3$ (3.3 oz) and was movable between a filling station, a thermal treatment zone and a discharge station.

In these tests, carrot dices and pineapple cubes constituted the discrete food pieces. A variety of particle sizes were monitored, with the minimum dimension of the food pieces ranging between 2/8″ to ¾″ (0.95 to 1.91 cm.). Tables 1 and 2 present data on the specific particle sizes tested for the carrot dices and pineapple cubes, respectively.

In these tests, the cup was initially filled with a batch of food pieces. In order to monitor the actual temperature of different size food pieces during treatment, a thermocouple was embedded in the center of a food piece located at approximately the center of the cup. The tables present data on the monitored food pieces. After filling, the cup was moved to the thermal treatment zone where atmospheric pressure steam was initially passed downwardly through the cup. Upon reaching the desired temperature, as measured by the thermocouple, the hot food pieces were then rapidly cooled by spraying the top of the cup with cold water at a temperature of 65° F. (18° C.), until the pieces were cooled to a temperature below 100° F. (38° C.). The pieces were thereafter discharged into a sealable container.

Tables 1 and 2 present data on both the heating and cooling of the food pieces. As shown in Table 1, all of the carrot pieces were rapidly heated to the required pasteurization temperature. The average treatment time was about 90 seconds, with the largest piece taking about 3 minutes. The carrot pieces were similarly rapidly cooled. The average elapsed cooling time was about 80 seconds. As expected, the largest sized pieces took the longest time, abut 2.25 minutes. The pineapple chunks (Table 2) took longer to both heat and cool than the carrot dices. The pieces were all larger than ½″ in smallest dimension. The average heating time was about 3 minutes; while the average cooling time was about 2 minutes. Subsequent examination of the food pieces verified that the treatment did not significantly impair their organoleptic quality. These results aptly demonstrate the effectiveness of the present invention for pasteurizing discrete fresh food pieces without adversely affectly their organoleptic properties.

While preferred embodiments of this invention have been discussed herein, those skilled in the art will appreciate that changes and modifications may be made without departing from the spirit and scope of this invention, as defined in and limited only by the scope of the appended claims. For example, while the present invention has been specifically described with respect to the pasteurization of discrete fresh food pieces and has been shown to have particular utility therein, it is anticipated that the invention may have applicability to the heat treatment of fresh food pieces at temperatures above the stated pasteurization range, e.g., in connection with sterilization procedures. Consequently, the invention need not be limited solely to heat treatment to effect pasteurization.

TABLE 1

RESULTS OF CARROT TESTING

| Piece Size | | Approximate Elapsed Time | Approximate Elapsed Time |
|---|---|---|---|
| Thickness (in) | Diameter (in) | Heating to 175° F. (sec) | Cooling from 175° F. to 100° F. (sec) |
| ⅜ | 1 | 70 | 60 |
| ⅜ | ⅞ | 63 | 64 |
| ⅜ | ⅞ | 52 | 64 |
| ⅜ | 1 | 70 | 67 |
| 7/16 | ⅞ | 97 | 85 |
| ½ | 13/16 | 186 | 136 |
| ⅜ | ⅞ | 96 | 97 |
| 7/16 | ⅞ | 93 | 84 |
| ½ | ¾ | 73 | 69 |
| ⅜ | 1⅛ | 93 | 79 |

TABLE 2
RESULTS OF PINEAPPLE TESTING

| Piece Size Thickness (inch) | Approximate Elapsed Time Heating to 175° F. (sec) | Approximate Elapsed Time Cooling from 175° F. to 100° F. (sec) |
| --- | --- | --- |
| ⅜ | 188 | 117 |
| ⅜ | 153 | 107 |
| ⅜ | 232 | 125 |
| ⅜ | 265 | 136 |
| ⅜ | 134 | 83 |
| ⅜ | 175 | 130 |
| ⅜ | 166 | 82 |
| ⅜ | 145 | 83 |

What is claimed is:

1. A continuous method of heat treating discrete pieces of fresh foods without significantly affecting their organoleptic properties comprising the steps of:
   (a) filling individual confined treatment zones provided in a conveyor with said discrete food pieces, said discrete food pieces having a largest dimension of about two inches, said confined treatment zones retain separate, finite portions of essentially immobile discrete food pieces while permitting fluids to flow therethrough;
   (b) conveying said confined treatment zones through a thermal processing zone comprising a heating zone and a cooling zone;
   (c) passing said confined treatment zones through said heating zone and flowing a heating fluid through said confined treatment zones to rapidly heat by direct contact the entire mass of food pieces therein to an elevated temperature of at least 165° F. in less than 10 minutes without significantly degrading the texture, structure, taste and color of the fresh food pieces;
   (d) thereafter passing said confined treatment zones through said cooling zone and flowing a cooling fluid through said confined treatment zones to rapidly cool by direct contact the previously heated food pieces to near ambient temperature within 10 minutes after said food pieces reach said elevated temperature in step (c); and
   (e) discharging said near ambient temperature discrete food pieces from said confined treatment zones into containers under purified conditions.

2. A continuous method of heat treating discrete pieces of fresh foods without significantly affecting their organoleptic properties comprising the steps of:
   (a) filling individual confined treatment zones with said discrete food pieces, said discrete food pieces having a largest dimension of about two inches, each treatment zone comprising a recess in a conveyor having a porous bottom retainer and an open top and retaining separate finite portions of essentially immobile discrete food pieces while permitting fluids to flow therethrough;
   (b) passing each filled recess through a heating zone wherein a heating fluid is flowed through each recess to rapidly heat by direct contact the entire mass of food pieces therein to an elevated temperature of at least 165° F. in less than 10 minutes without significantly degrading the texture, structure, taste and color of the fresh food pieces;
   (c) thereafter passing each filled recess through a cooling zone wherein a cooling fluid is flowed through each recess to rapidly cool by direct contact the previously heated food pieces to near ambient temperature within 10 minutes after said food pieces reach said elevated temperature in step (b); and
   (d) passing each filled recess to a packaging zone wherein the near ambient temperature food pieces are discharged from each recess and are packed under purified conditions directly in a container and thereafter hermetically sealed therein.

3. The method of claims 1 or 2 wherein the elevated temperature of said heat treating is within the pasteurization range of 165° to 185° F.

4. The method of claim 2 wherein the recess also has a porous top retainer.

5. The method of claims 1 or 2 wherein said confined treatment zone is sized to hold a separate, finite portion of discrete food pieces equal in volume to a single-serving size container.

6. The method of claims 1 or 2 wherein the heating fluid is saturated steam.

7. The method of claims 1 or 2 wherein the heating fluid is hot water having a temperature of at least 200° F.

8. The method of claims 1 or 2 wherein the cooling fluid is sterile water.

9. The method of claim 8 wherein the water is at a temperature between 40° and 85° F.

10. The method of claims 1 or 2 wherein the cooling fluid is a gas.

11. The method of claim 10 wherein the gas is air, nitrogen or fluorocarbon.

12. The method of claim 6 wherein the steam is flowed downwardly through said confined treatment zone.

13. The method of claims 1 or 2 wherein a liquid component is also added to the container with the food pieces.

14. The method of claims 1 or 2 wherein the discrete pieces of fresh foods are selected from the group consisting of fruits, vegetables and nuts.

15. The method of claims 1 or 2 wherein said confined treatment zone has a volume between about 0.1 to 1.0 liters.

16. A continuous method of heat treating discrete pieces of fresh foods without significantly affecting their organoleptic properties comprising the steps of:
   (a) filling individual confined treatment zones with said discrete food pieces, said discrete food pieces substantially having a minimum dimension of no greater than about 0.5 inch, each treatment zone comprising a recess in a conveyor having a porous bottom retainer and an open top and having a volume of between about 0.1 to 1.0 liter to retain separate, finite portions of essentially immobile discrete food pieces while permitting fluids to flow therethrough;
   (b) passing each filled recess through a heating zone wherein steam is flowed downwardly through each recess to purge air from the recess and heat by direct contact the food pieces to a pasteurization temperature of about 165° to 185° F. in less than 10 minutes without significantly degrading the texture, structure, taste and color of the fresh food pieces;
   (c) thereafter passing each filled recess through a cooling zone wherein sterile water is flowed downwardly through each recess so as to cool by direct contact the previously heat food pieces to a temperature of less than about 110° F., said cooling being completed within 10 minutes after said pieces reach said pasteurization temperature in step (b); and (d) passing each filled recess to a packaging zone wherein the cooled food pieces are discharged from each recess and are packed under purified conditions directly in a container and thereafter hermetically sealed therein.

17. The method of claim 16 wherein said food pieces are heated to said pasteurization temperature in about 1 to 3 minutes and said heated food pieces are cooled to a temperature of less than 100° F. within about 5 minutes after said food pieces reach said pasteurization temperature.

18. The method of claim 17 wherein said cooling is completed within about 3 minutes after said food pieces reach said pasteurization temperature.

* * * * *